(12) United States Patent
Kato

(10) Patent No.: US 8,380,059 B2
(45) Date of Patent: *Feb. 19, 2013

(54) FOCUS ADJUSTING APPARATUS

(75) Inventor: Takashi Kato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/077,308

(22) Filed: Mar. 31, 2011

(65) Prior Publication Data

US 2011/0243540 A1 Oct. 6, 2011

(30) Foreign Application Priority Data

Mar. 31, 2010 (JP) ................................ 2010-083773

(51) Int. Cl.
  *G03B 17/00* (2006.01)
  *G03B 3/10* (2006.01)
(52) U.S. Cl. .......................................... 396/82; 396/131
(58) Field of Classification Search .................... 396/76, 396/77, 79, 85, 86, 131, 82
  See application file for complete search history.

(56) References Cited

U.S. PATENT DOCUMENTS

| 3,734,869 A * | 5/1973 | Menard et al. ............... 200/11 R |
| 7,526,190 B2 * | 4/2009 | Kato ................................. 396/73 |
| 2009/0273702 A1* | 11/2009 | Okawara ....................... 348/345 |

FOREIGN PATENT DOCUMENTS

| JP | 03-036511 A | 2/1991 |
| JP | 7-274053 A | 10/1995 |
| JP | 3429050 B2 | 10/1995 |
| JP | 2004102113 A * | 4/2004 |

OTHER PUBLICATIONS

JP 2004-102113A Machine Translation available from JPO website.*
JP 07-274053A Machine Translation available from JPO website.*

* cited by examiner

*Primary Examiner* — W. B. Perkey
*Assistant Examiner* — Minh Phan
(74) *Attorney, Agent, or Firm* — Rossi, Kimms & McDowell LLP

(57) ABSTRACT

A focus adjusting apparatus comprises a focus operating unit for generating a focus command signal for driving a focus lens according to an operating amount of the focus operating unit; a focus driving unit for driving the focus lens in response to the focus command signal from the focus operating unit; a focus position detecting unit for detecting a position of the focus lens; a focus detecting unit for detecting whether or not in-focus is achieved or detecting deviation amount from in-focus position; and an operation sensitivity determining unit for determining a focus operating sensitivity of the focus operating unit, wherein the operation sensitivity determining unit determines the focus operating sensitivity and the position of the focus lens, and wherein the focus driving unit drives the focus lens according to the focus operating sensitivity.

10 Claims, 16 Drawing Sheets

FIG. 3

| FOCUS POSITION / ZOOM POSITION | 0 | 1000 | 2000 | ..... | 60000 |
|---|---|---|---|---|---|
| 0 | b0.0 | b1000.0 | b2000.0 | | b60000.0 |
| 1000 | b0.1000 | b1000.1000 | b2000.1000 | | b60000.1000 |
| 2000 | b0.2000 | b1000.2000 | b2000.2000 | | b60000.2000 |
| ..... | | | | | |
| 60000 | b0.60000 | b1000.60000 | b2000.60000 | | b60000.60000 |

FOCUS ADJUSTING APPARATUS

BACKGROUND OF THE INVENTION

1. Field of the Invention

The present invention relates to a focus adjusting apparatus for an image pickup apparatus, for example, a television camera.

2. Description of the Related Art

In a focus adjusting apparatus for an image pickup apparatus, for example, a television camera, focus adjustment is performed by a servo unit including a driving system (for example, motor) and a control system for controlling the driving system. In order to supply a commanding signal to the control system of the servo unit, a focus demand 18 as illustrated in FIG. 15 is used.

FIG. 16 is a block diagram illustrating a conventional focus adjusting apparatus for a television lens. An operating amount of the focus demand 18 is first detected. Then, a focus command signal from a zoom-focus operating circuit 17 which computes a focus command value and a focus position signal from a focus position detecting unit 10 are input to a lens controller 9. The lens controller 9 outputs, to a focus driver 13, a focus controlling signal for adjusting a difference between the focus command signal and the focus position signal to 0. Next, the focus driver 13 controls a focus motor 14 in response to the focus controlling signal to control a focus lens. In this case, the operating amount of the focus demand 18 and a driving amount of the focus lens have a linear relationship as illustrated in FIG. 17.

When the operating amount of the focus operating knob (focus demand) and the driving amount of the focus lens have the linear relationship, focusing sensitivity relative to the rotation amount (operating amount) of the focus operating knob increases under a condition in which an field depth is small. Therefore, there has been proposed a focus adjusting apparatus in which the focus driving amount relative to the operating amount of the focus operating knob is determined based on the field depth information (for example, Japanese Patent No. 3429050 or Japanese Patent Application Laid-Open No. 3-36511).

However, when the focus driving amount relative to the operating amount of the focus operating knob is determined based on the depth information, the following problem arises. For example, when the field depth is small, focusing in the vicinity of an in-focus position is easy. However, in a case where a focus deviation amount is large, a focal position cannot reach the in-focus position unless the operating amount of the focus operating knob is increased.

SUMMARY OF THE INVENTION

Therefore, an object of the present invention is to solve the problem described above and provide a focus adjusting apparatus with improved operability in focus adjustment.

In order to attain the above-mentioned object, a focus adjusting apparatus according to the present invention includes: a focus operating unit for generating a focus command signal for driving a focus lens according to a operating amount of the focus operating unit; a focus driving unit for driving the focus lens in response to the focus command signal from the focus operating unit; a focus position detecting unit for detecting a position of the focus lens; a focus detecting unit for detecting a focus information; and an operation sensitivity determining unit for determining a focus operating sensitivity of the focus operating unit based on an in-focus information obtained by the focus detecting unit and the position of the focus lens where the focus operating sensitivity of the focus operating unit is defined as a ratio of a moving amount of the focus lens to an operating amount of the focus operating unit, in which the focus driving unit drives the focus lens according to the focus operating sensitivity determined by the operation sensitivity determining unit.

In another aspect of the present invention, a lens apparatus includes: a focus lens; and a focus adjusting apparatus, in which the focus adjusting apparatus includes: a focus operating unit for generating a focus command signal for driving the focus lens according to an operating amount of the focus operating unit; a focus driving unit for driving the focus lens in response to the focus command signal from the focus operating unit; a focus position detecting unit for detecting a position of the focus lens; a focus detecting unit for detecting a focus information; and an operation sensitivity determining unit for determining a focus operating sensitivity of the focus operating unit based on an in-focus information obtained by the focus detecting unit and the position of the focus lens where the focus operating sensitivity of the focus operating unit is defined as a ratio of a moving amount of the focus lens to an operating amount of the focus operating unit, in which the focus driving unit drives the focus lens according to the focus operating sensitivity determined by the operation sensitivity determining unit.

In another aspect of the present invention, a camera system includes: a lens apparatus including a focus lens; and a camera apparatus for performing image pickup of an object image through the lens apparatus, in which the camera system comprising a focus adjusting apparatus, and in which the focus adjusting apparatus including: a focus operating unit for generating a focus command signal for driving the focus lens according to an operating amount of the focus operating unit; a focus driving unit for driving the focus lens in response to the focus command signal from the focus operating unit; a focus position detecting unit for detecting a position of the focus lens; a focus detecting unit for detecting a focus information; and an operation sensitivity determining unit for determining a focus operating sensitivity of the focus operating unit based on an in-focus information obtained by the focus detecting unit and the position of the focus lens where the focus operating sensitivity of the focus operating unit is defined as a ratio of a moving amount of the focus lens to an operating amount of the focus operating unit, and wherein the focus driving unit drives the focus lens according to the focus operating sensitivity determined by the operation sensitivity determining unit.

Other objects or further features of the present invention will become apparent from the following description of exemplary embodiments with reference to the attached drawings.

According to the present invention, an effect of improving the operability in the focus adjustment during manual focusing is obtained without depending on conditions such as a depth and a focus position.

BRIEF DESCRIPTION OF THE DRAWINGS

FIG. 3 illustrates an optical focus sensitivity table.

DESCRIPTION OF THE EMBODIMENTS

Hereinafter, embodiments of the present invention are described in detail with reference to the attached drawings.

First Embodiment

Description of Entire Block Diagram

Figure 1:
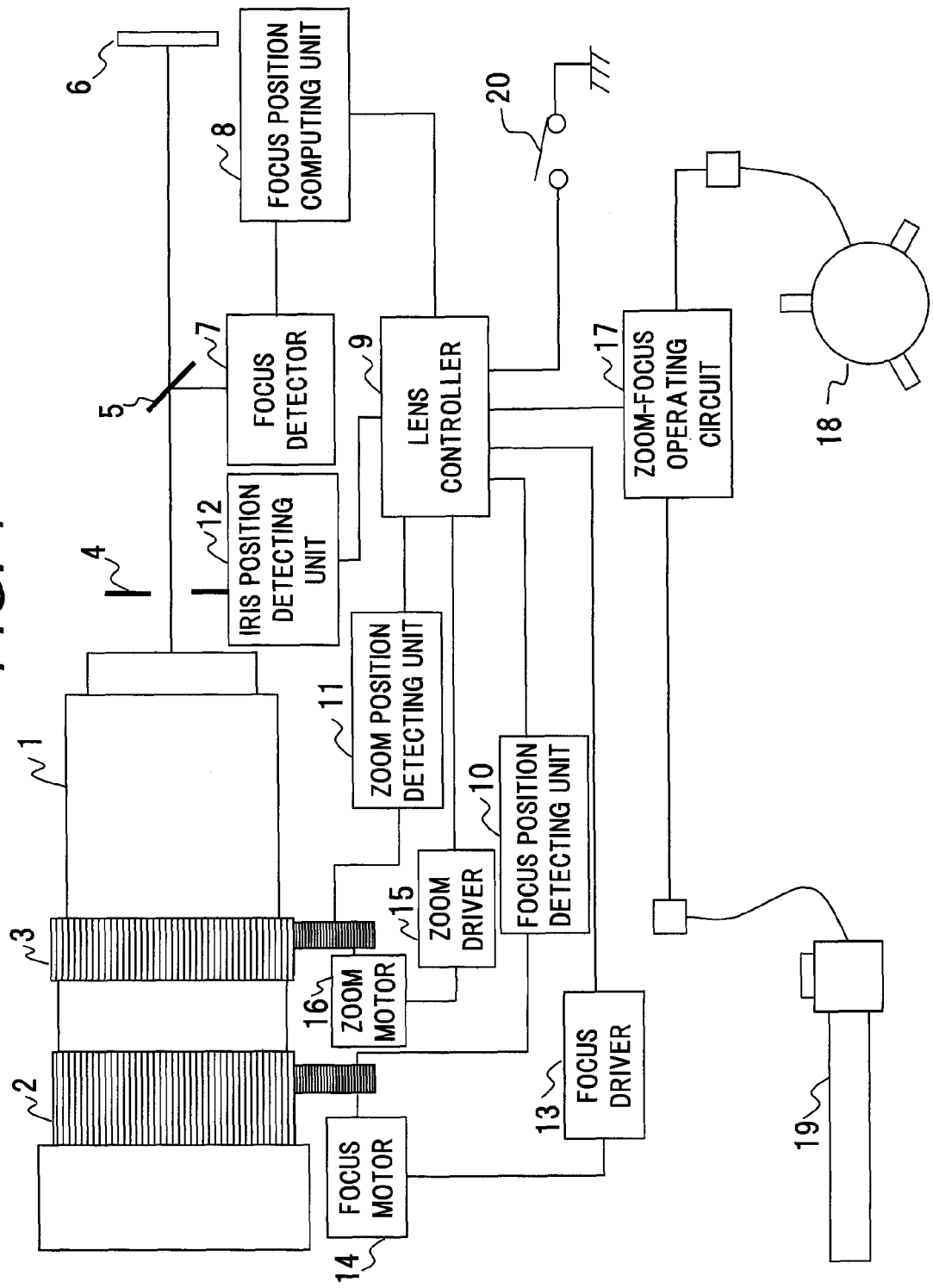
FIG. 1 is a block structural diagram illustrating a focus adjusting apparatus according to a first embodiment of the present invention.

FIG. 1 is a block structural diagram illustrating a focus adjusting apparatus according to the first embodiment of the present invention. A zoom lens 1 is of a front lens focus type and includes a focus lens unit, a zoom lens unit and an iris adjusting unit. A focus ring 2 for driving the focus adjusting lens and a zoom ring 3 for driving the zoom lens are provided on an object side (front side) of the zoom lens 1.

An output of a focus position detecting unit 10 for detecting a position of the focus ring 2, an output of a zoom position detecting unit 11 for detecting a position of the zoom ring 3 and an output of an iris position detecting unit 12 for detecting a status of an iris 4 are connected to a lens controller 9.

Outputs of the lens controller 9 are connected to a focus driver 13 and a zoom driver 15. The focus driver 13 drives the focus ring 2 through a focus motor 14. The zoom driver 15 rotates the zoom ring 3 through a zoom motor 16. In addition, a zoom-focus operating circuit 17 and an automatic focusing (AF) switch 20 are connected to the lens controller 9. An output of a focus demand 18 and an output of a zoom demand 19 are connected to the zoom-focus operating circuit 17.

The focus ring 2 is rotated in conjunction with the front focus lens unit, and hence the focus adjustment may be performed by the movement of the focus lens unit. The focus position detecting unit 10 detects a position of the focus lens unit and sends a position signal indicating the detected position to the lens controller 9. The zoom ring 3 is rotated to move the zoom lens unit along a cam groove machined in a fixed lens barrel, to thereby vary magnification. The zoom position detecting unit 11 is connected to a gear engaged with the zoom ring 3 and detects a position of the zoom lens. The zoom motor 16 causes the zoom ring 3 to rotate through the gear, to thereby move the zoom lens unit.

The lens controller 9 generates driving signals corresponding to operating amounts of the focus demand 18 and the zoom operating unit (zoom demand) 19 which are sent through the zoom-focus operating circuit 17. The focus motor 14 and the zoom motor 16 drive the focus ring 2 and the zoom ring 3 to operate the focus ring 2 and the zoom ring 3, respectively, in response to the driving signals.

In this embodiment, assume that the focus demand 18 is a demand having no operation end to which an operable range is mechanically limited, that is, an endless demand.

A half mirror 5 is disposed on the object side of a charge coupled device (CCD) 6 which is a light receiving element of an image pickup apparatus. A focus detector 7 is disposed in a reflecting direction of the half mirror 5. An output of the focus detector 7 is connected to the lens controller 9 through a focus position computing unit 8.

The focus detector 7 detects an in-focus state (detects whether or not in-focus is achieved or detects deviation amount from in-focus position). That is, the focus detector 7 is a focus detecting unit for detecting focus information which represents how much an object to be shot is close to an in-focus state including whether or not the object is in in-focus position by a phase difference, a contrast, a distance in the optical axis direction within the angle of field (distance between the object and the in-focus position) or the like. The focus detector 7 includes an AF sensor of a phase difference type which has multiple sets of line sensor arrays. The focus detector 7 receives light from an object through the half mirror 5 and accumulates electric charge in a light receiving element. When a focal point of the focus lens unit is located before a surface of the CCD 6 (on object side), object images formed on the sets of line sensor arrays are close to each other. When the focal point is located after the surface of the CCD 6 (side at distance from object), object images are apart from each other. A displacement amount of a relative position between the object images has a specific function relationship with an amount of out-of focus of an AF lens. Therefore, the amount of out-of focus, that is, a so-called defocus amount may be detected based on an output of each of the sets of line sensor arrays.

Description and Definition of Focus Operating Sensitivity

In the present invention, focus operating sensitivity is defined by Expression (1) given below.

$$\text{(Focus driving amount)} = \text{(focus operating sensitivity)} \times \text{(focus operating amount)} \quad (1)$$

A focus operating amount corresponds to, for example, a rotating angle of a focus operating knob of the focus demand. A focus driving amount corresponds to a movement amount of the focus lens unit. In other words, the focus operating sensitivity means the movement amount of the focus lens unit (in-focus position on field side) relative to the operating amount of the focus operating unit (focus demand or focus operating knob). In detail, the focus operating sensitivity is a ratio of a moving amount of the focus lens to an operating amount of the focus operating unit. The moving amount of the focus lens relative to the unit operating amount is larger as the focus operating sensitivity is larger (the ratio is larger). Otherwise, the moving amount of the focus lens relative to the unit operating amount is smaller as the focus operating sensitivity is smaller (the ratio is smaller). Here, the moving amount of the focus lens may be a real moving amount of the focus lens or a moving amount of a focus point (in-focus position for an object). Hereinafter, a procedure for computing the focus operating sensitivity is described with reference to flow charts.

Description of Flow Chart for Focal Position Detecting

Figure 2:
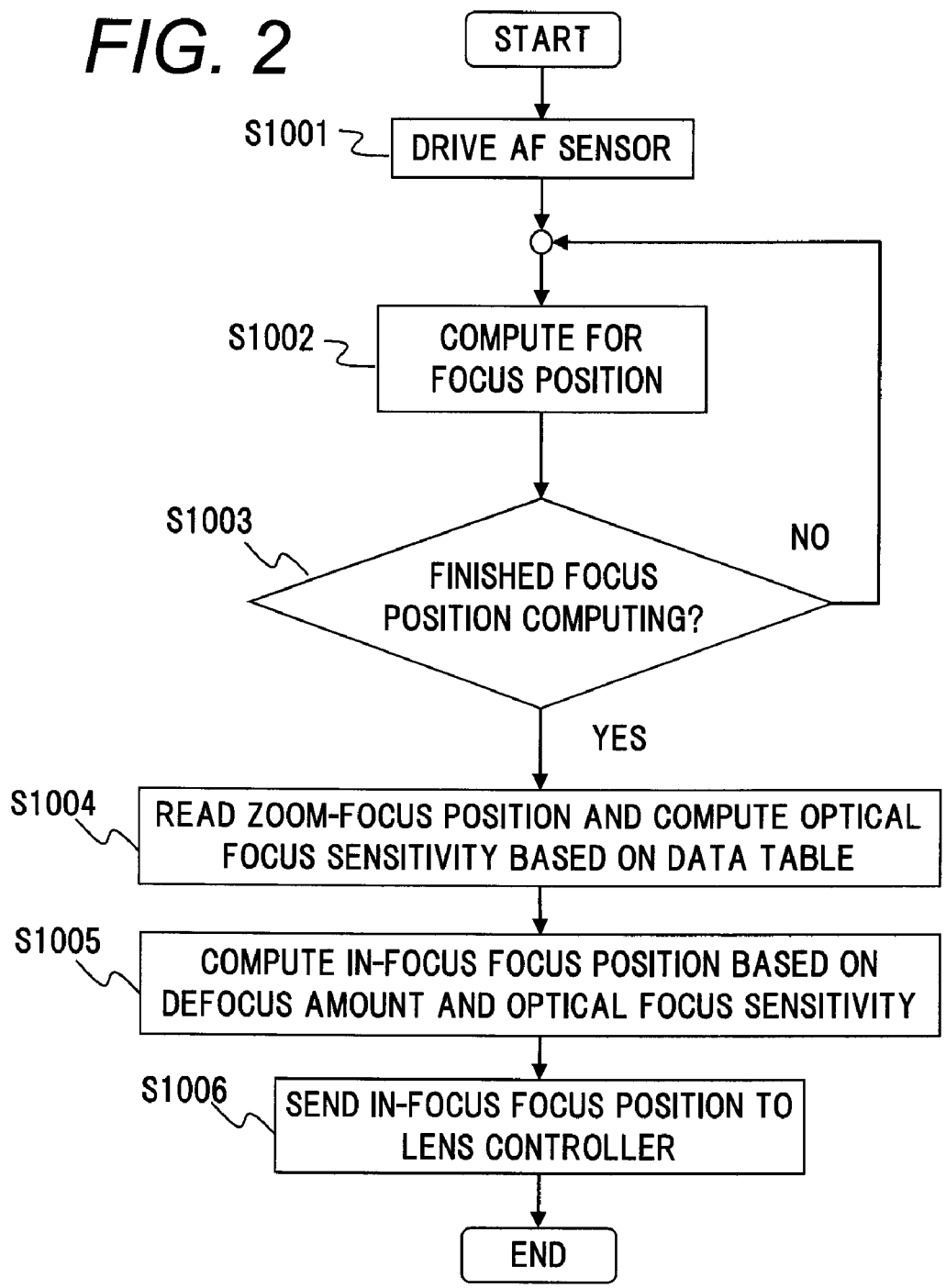
FIG. 2 is a flowchart illustrating focal position detecting processing in the first embodiment.

FIG. 2 is a flow chart illustrating a focus detecting operation for computing focus information required to determine the focus operating sensitivity. When a power supply of the focus adjusting apparatus is turned on, the processing proceeds to Step S1001 to drive the AF sensor included in the focus detector 7. Then, the processing proceeds to Step S1002 to perform computing for focus position. After that, the processing proceeds to Step S1003. When the computing for focus position is not finished, the processing returns to Step S1002. When the computing for focus position is finished, the processing proceeds to Step S1004. In this embodiment, the zoom lens is provided as an example, and hence optical focus sensitivity determined by a zoom position and a focus position is required to compute the in-focus focus position based on the defocus amount. A table from which optical focus sensitivity ($b_{Pf,Pz}$) can be computed based on a zoom position (Pz) and a focus position (Pf) as illustrated in FIG. 3 is prepared in advance in the focus position computing unit. In a case of a single-focus lens, zoom position information is unnecessary and a sensitivity table for the focus position is only necessary to be prepared. In Step S1004, the optical focus sensitivity is computed based on the table and the processing proceeds to Step S1005. In Step S1005, the in-focus focus position is computed by Expression (2) given below based on the defocus amount obtained by the computing for focus position detection and the optical focus sensitivity.

(In-focus focus position)=(defocus amount)×(optical focus sensitivity)  (2)

Next, in Step S1006, the in-focus focus position is sent to the lens controller 9 and the focus position detecting processing is finished.

Description of Flow Chart for Focus Operating Sensitivity

Figure 4:
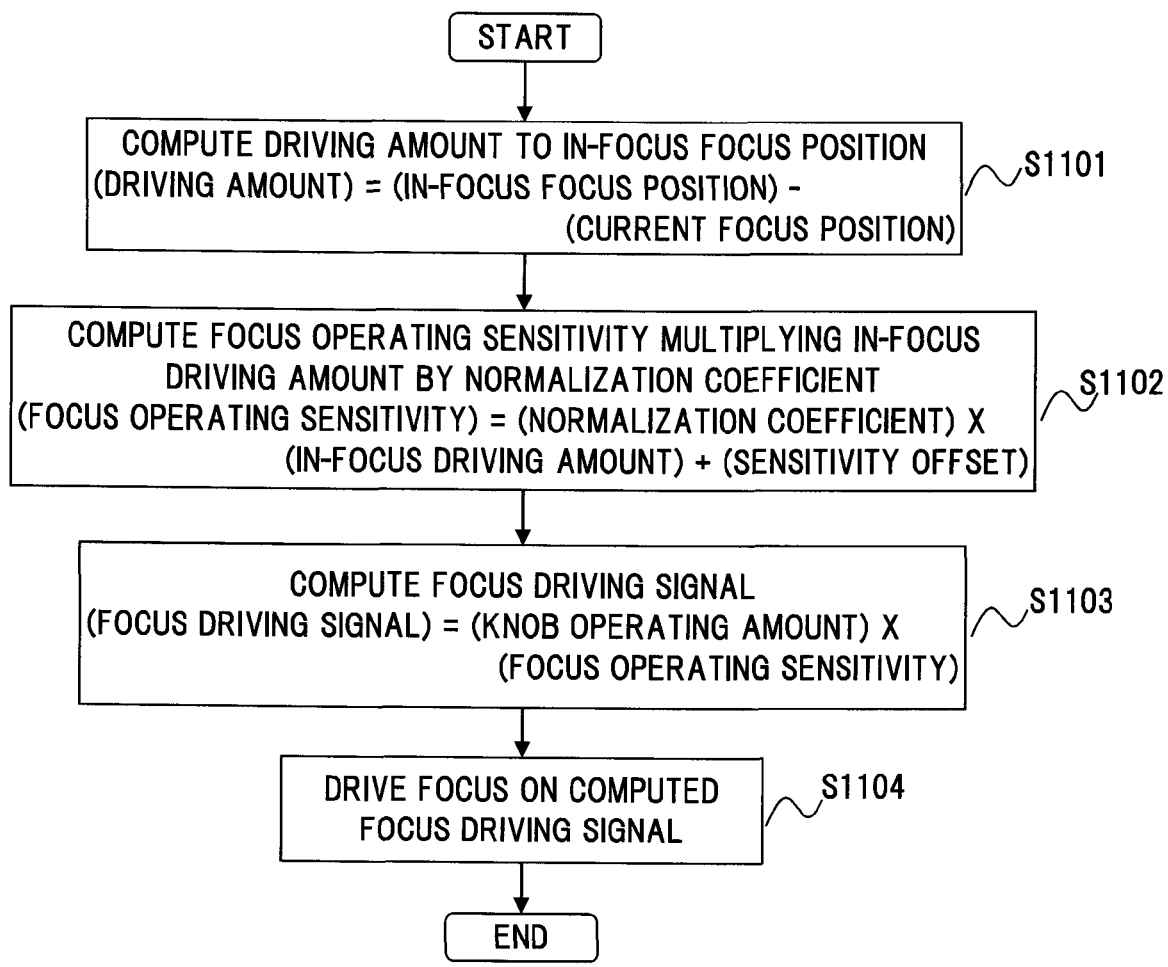
FIG. 4 is a flowchart of the procedure of the computing of focus operating sensitivity in the first embodiment.

FIG. 4 is a flow chart illustrating focus operating sensitivity computing of the lens controller (focus operating sensitivity determining unit) 9 according to this embodiment.

In Step S1101, the driving amount of the focus lens unit required for shifting to the in-focus position is computed based on the defocus amount computed by the focus detector and a current position of the focus lens unit detected by the focus position detecting unit. In Step S1102, the focus operating sensitivity is determined by multiplying the focus driving amount required for shifting to the in-focus position by a coefficient for normalizing the focus operating sensitivity.

(Focus operating sensitivity)=(focus driving amount)× (normalization coefficient)  (3)'

Figure 5:
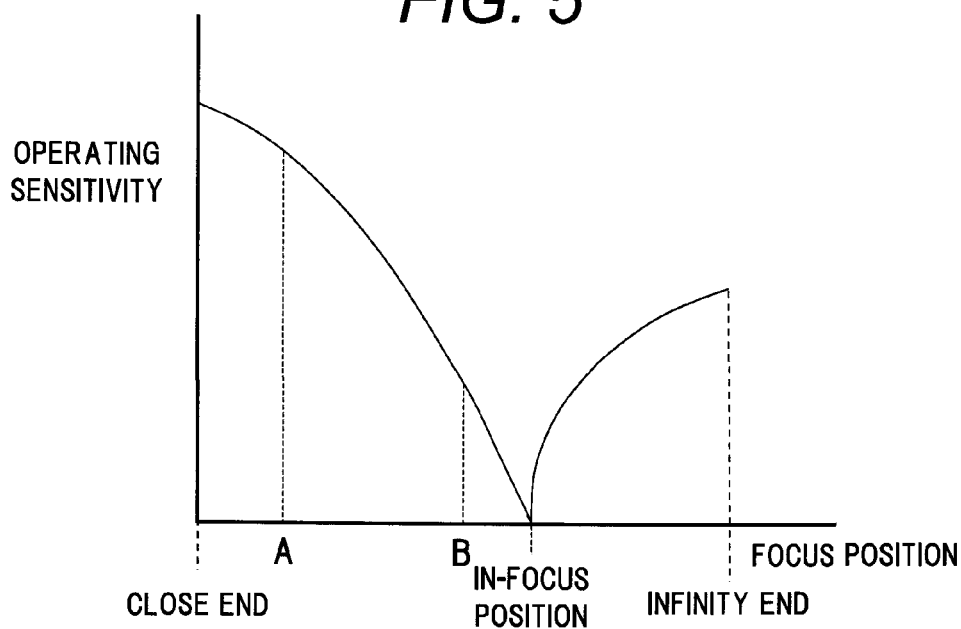
FIG. 5 illustrates a relationship between a focus position and focus operating sensitivity.
Figure 6:
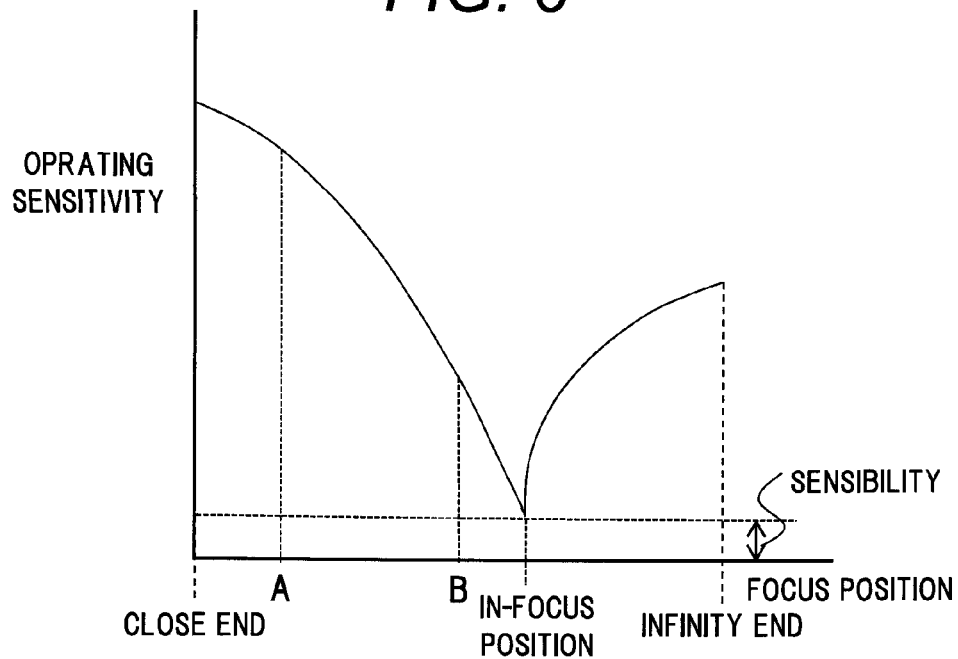
FIG. 6 illustrates a relationship between the focus position and the focus operating sensitivity (offset addition).

In a case where the focus operating sensitivity is to be determined by Expression (3)', when the focus detector determines that the in-focus state is achieved, that is, when the focus driving amount required for in-focus is 0, the focus operating sensitivity is 0 as illustrated in FIG. 5. Therefore, the focus lens unit is locked to prevent from being driven even when the focus operating knob is operated. Thus, in this embodiment, as illustrated in FIG. 6 (Expression (3)), a sensitivity offset is added to the focus operating sensitivity computing expression so that the focus lens unit may be driven when the focus operating knob is rotated at the in-focus position.

(Focus operating sensitivity)=(focus driving Amount)×(normalization coefficient)+(sensitivity offset)  (3)

Next, the processing proceeds to Step S1103 and the focus driving amount is computed based on the focus operating sensitivity computed in Step S1102 and the focus operating amount. In Step S1104, the focus driving is performed based on the focus driving amount as the control signal.

Effect Obtained by Changing Focus Operating Sensitivity

FIGS. 5 and 6 illustrate relationships between the focus position (position of the focus lens unit) and the focus operating sensitivity in a focus operating sensitivity variable mode in which the focus operating sensitivity is variable. For example, when the focus lens unit is at a position "A", the position "A" is at a distance from the in-focus position computed by the focus position computing unit, and hence the focus operating sensitivity value becomes large. Therefore, the focus position may be significantly shifted with a small operating amount of the focus operating knob and thus rapidly shifted to the vicinity of the in-focus position. In contrast to this, when the focus lens unit is at a position "B" close to the in-focus position, the focus operating sensitivity value is small. Thus, even when the operating amount of the focus operating knob is large, the focus driving amount is small, and hence fine focus adjustment may be facilitated.

Second Embodiment

Figure 7:
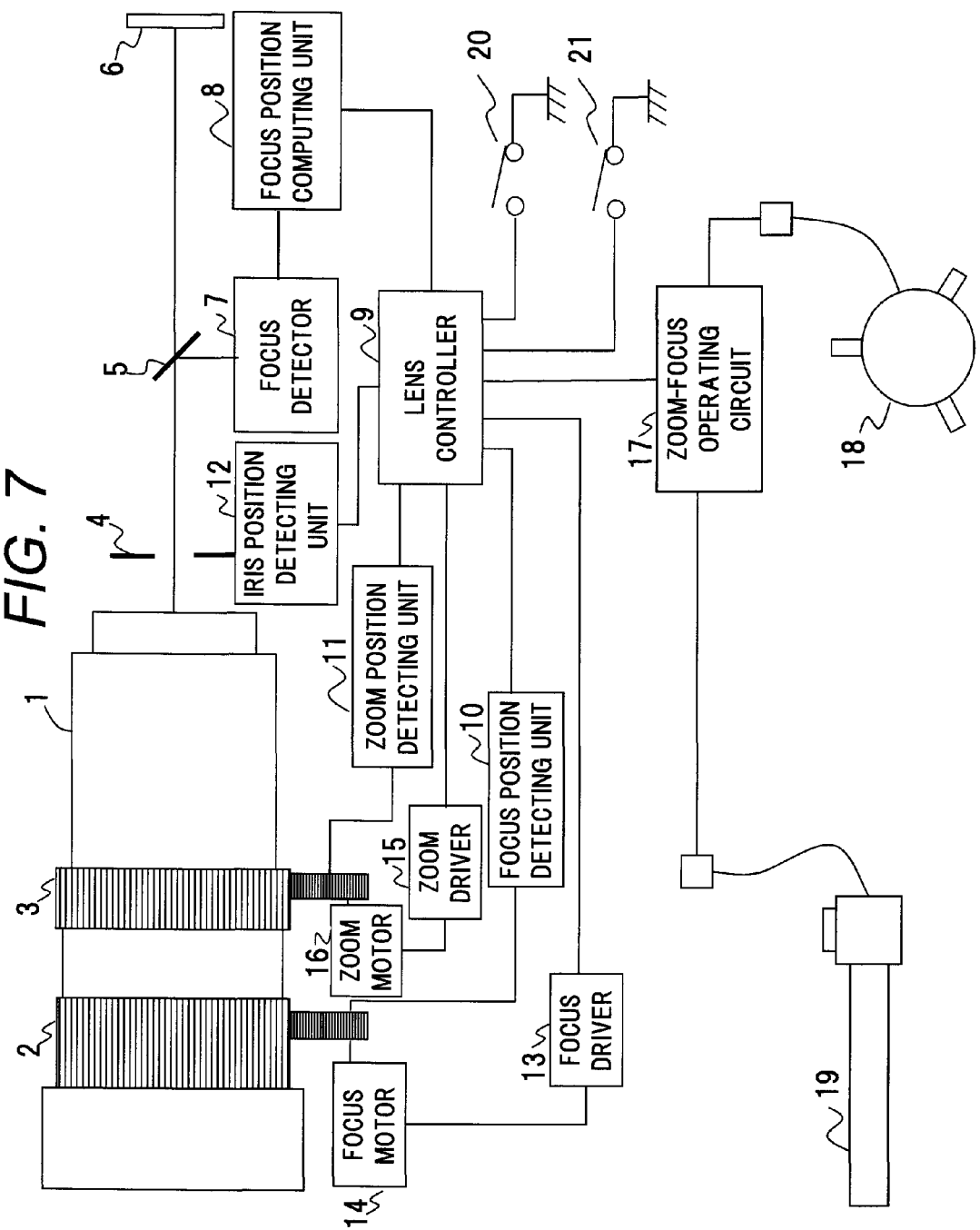
FIG. 7 is a block structural diagram illustrating a focus adjusting apparatus according to a second embodiment of the present invention.

FIG. 7 is a block structural diagram illustrating a focus adjusting apparatus according to the second embodiment of the present invention. A feature of the focus adjusting apparatus according to the second embodiment is that a focus sensitivity variable switch (focus mode switching unit) 21 is additionally provided in the focus adjusting apparatus illustrated in FIG. 1.

Figure 8:
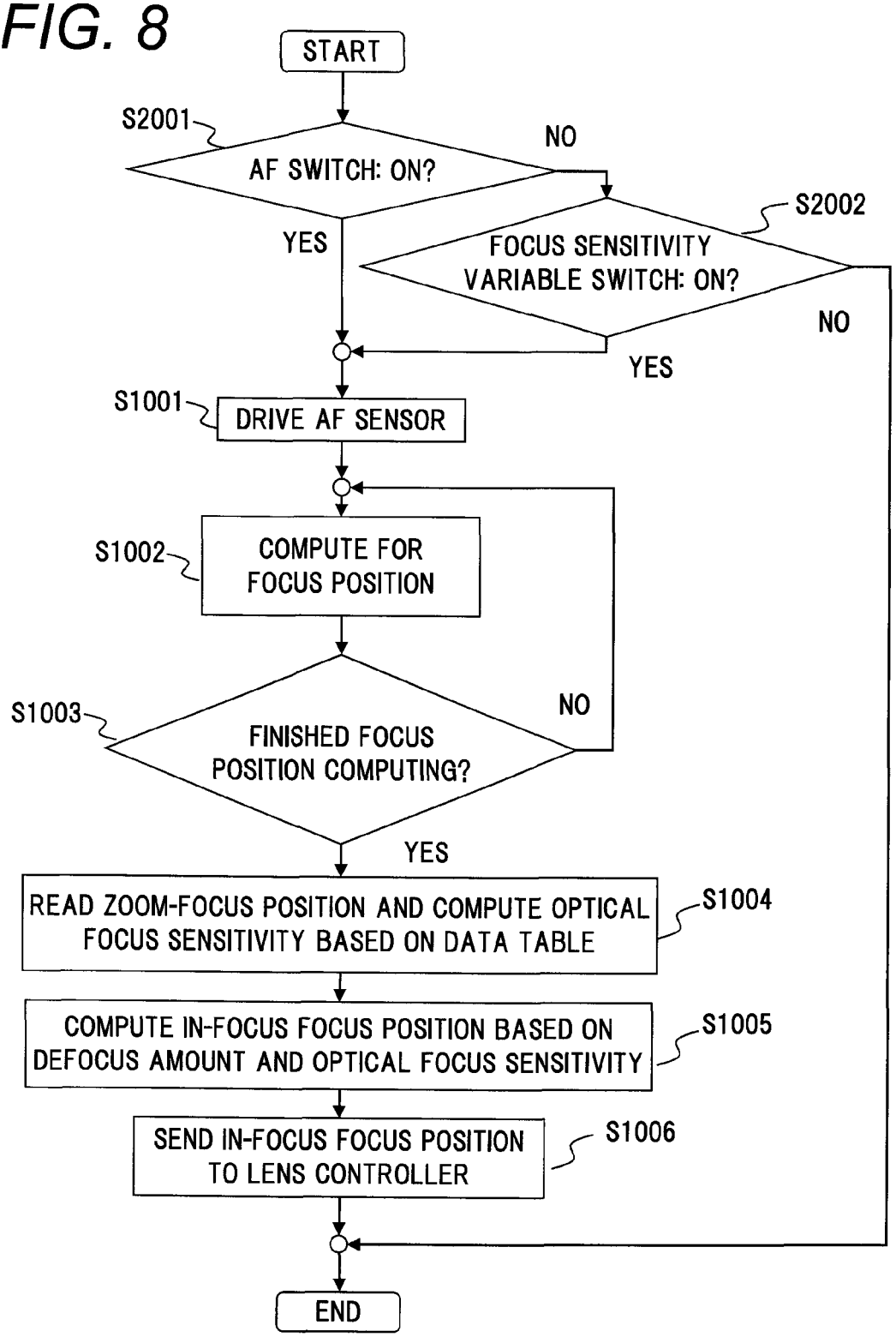
FIG. 8 is a flowchart of the procedure for the processing of focus detection in the second embodiment.

FIG. 8 is a flow chart illustrating a focus detecting operation which includes a branch between a mode in which the focus operating sensitivity is variable and a mode in which the focus operating sensitivity is fixed.

When a power supply of an image pickup system is turned on, whether or not the AF switch 20 is in an on state is determined in Step S2001. When the AF switch 20 is in the on state, the image pickup system becomes an AF operation state. The processing proceeds to Step S1001 and the AF sensor included in the focus detector 7 is driven. When the AF switch 20 is in an off state, the image pickup system becomes a manual focus state. The processing proceeds to Step S2002 and whether or not the focus sensitivity switch 21 is in an on state is determined. When the focus sensitivity variable switch 21 is in the on state, the image pickup system becomes a focus operating sensitivity variable mode. Then, the processing proceeds to Step S1001 and the AF sensor included in the focus detector 7 is driven.

A flow after Step S1001 is the same as the focal position detecting flow in the first embodiment as illustrated in FIG. 2, and hence the description thereof is omitted here.

Figure 9:
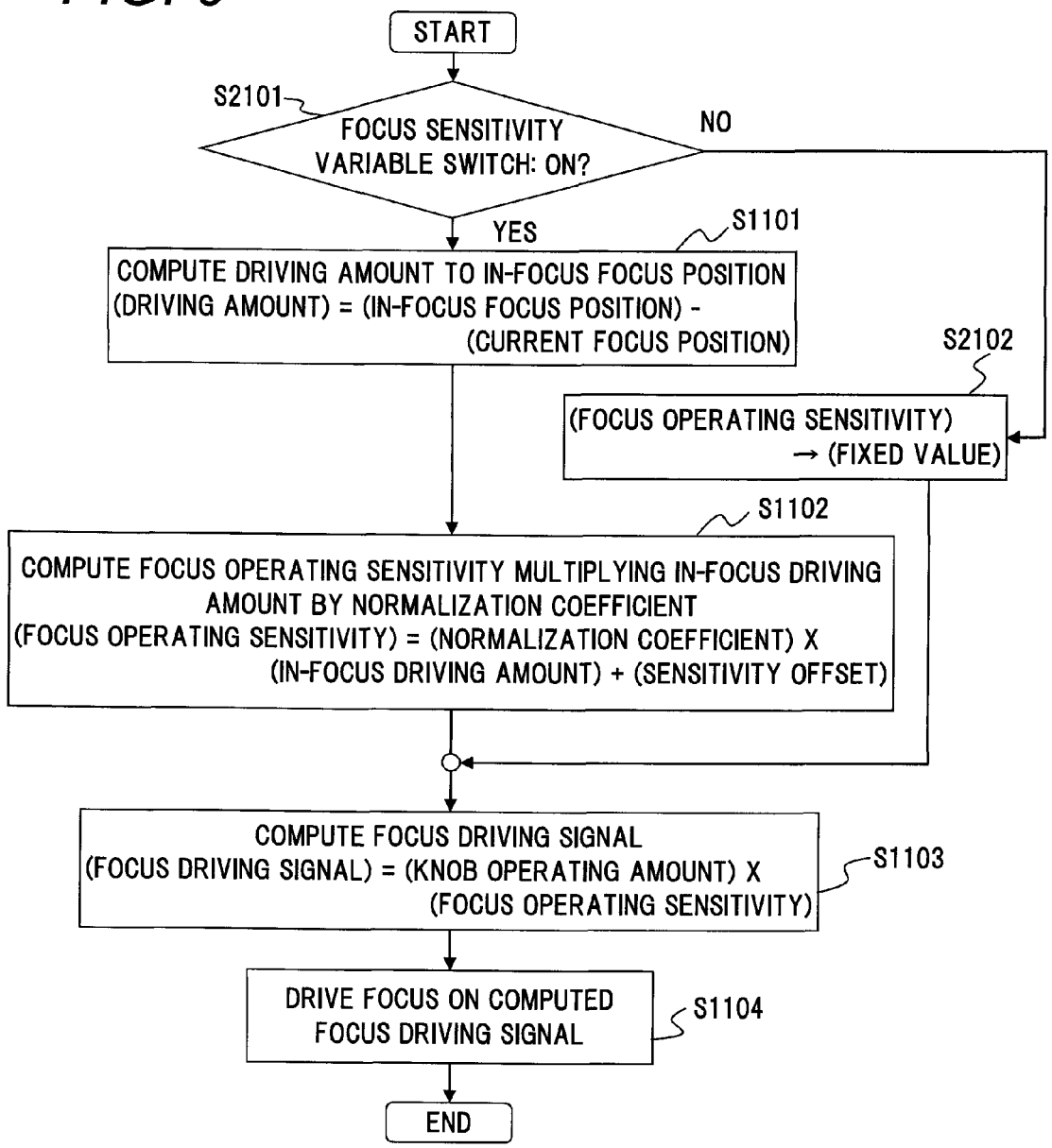
FIG. 9 is a flowchart of the procedure for the computing of focus operating sensitivity in the second embodiment.

FIG. 9 is a flowchart illustrating focus operating sensitivity computing.

Figure 17:
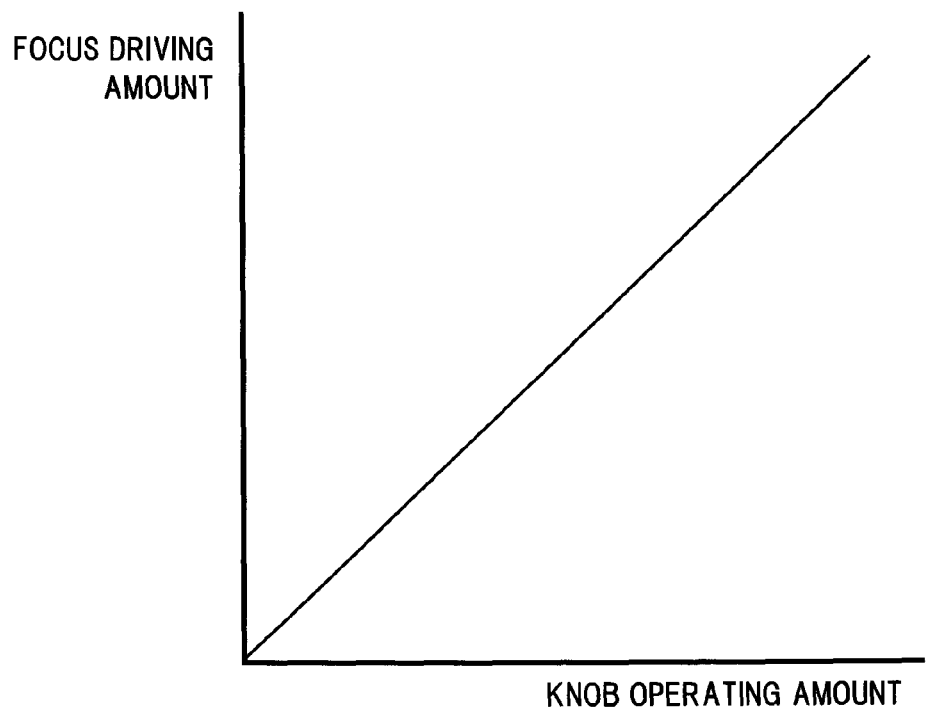
FIG. 17 illustrates a relationship between a focus operating amount and a focus driving amount.

In Step S2101, whether or not the AF sensitivity variable switch 21 is in the on state is determined. When the focus sensitivity variable switch 21 is in the on state, the image pickup system becomes the focus operating sensitivity variable mode and the processing proceeds to Step S1101. In Step S1101 and the subsequent steps, as in the flow in the first embodiment as illustrated in FIG. 4, the focus operating sensitivity is set to perform focus driving. When the focus sensitivity variable switch 21 is in the off state, the image pickup system becomes the focus operating sensitivity fixed mode and the processing proceeds from Step S2101 to Step S2102. In the focus operating sensitivity fixed mode, as illustrated in FIG. 17, the focus driving amount has the linear relationship with the operating amount of the focus operating knob. In Step S2102, the focus operating sensitivity is set to a predetermined fixed value. The processing proceeds to Step S1103. Then, as in the case of the first embodiment, the focus driving amount is computed to perform focus driving.

In this embodiment, a conventional focus adjusting method and the focus operating sensitivity variable adjusting method may be arbitrarily changed therebetween by the focus sensitivity variable switch 21 depending on conditions. The example of the switch is described as the unit for switching between the focus operating sensitivity variable mode and the focus operating sensitivity fixed mode. However, another method may be employed, that is, for example, switching may be performed in response to a communication command from an outside.

Third Embodiment

Figure 10:
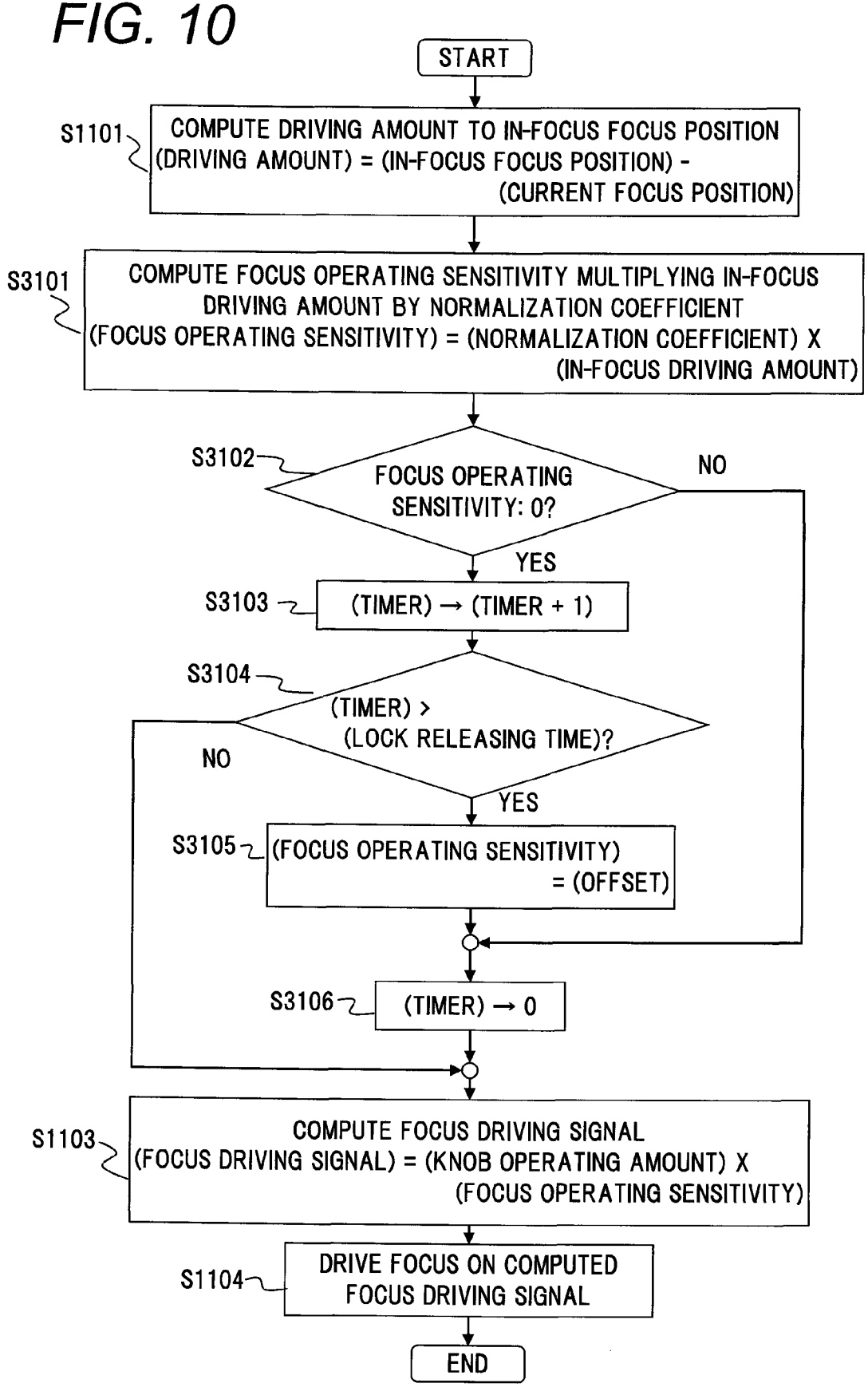
FIG. 10 is a flowchart of the procedure for the computing of focus operating sensitivity in a third embodiment of the present invention.

FIG. 10 is a flowchart illustrating focus operating sensitivity computing in the third embodiment.

As in the case of the flow chart (illustrated in FIG. 2) in the first embodiment, in Step S1101, the focus driving amount required for shifting to the in-focus position is computed based on the defocus amount computed by the focus detector and the current focus position detected by the focus position detecting unit. The processing proceeds to Step S3101, and the focus operating sensitivity is determined by multiplying the focus driving amount required for shifting to the in-focus position by the coefficient for normalizing the focus operating sensitivity. In this embodiment, Step S3101 is different from Step S1102 in the first embodiment illustrated in FIG. 4. In other words, in the case where the focus detector determines that the in-focus is achieved, that is, in the case where the focus driving amount required to reach the in-focus position is 0, when the focus operating sensitivity computed by the following expression (2a) is 0, a timer is started.

(Focus operating sensitivity)=(normalization coefficient)×(driving amount to in-focus position)  (2a)

After the lapse of a predetermined time, the sensitivity offset is added to the focus operating sensitivity (predetermined sensitivity offset value other than 0 is substituted into focus operating sensitivity) and the lock of the focus operation is released.

In Step S3102, whether or not the focus operating sensitivity is 0 is determined. When the focus operating sensitivity is 0, the processing proceeds to Step S3103. A focus lock release timer value (Timer) is incremented. In Step S3104, whether or not the focus lock releasing timer value reaches to a lock releasing time is determined. When the focus lock releasing timer value reaches to the lock releasing time, the processing proceeds to Step S3105. Then, the sensitivity offset (Offset) is added to the focus operating sensitivity to perform the focus operation. In Step S3106, the focus lock releasing timer value is cleared to 0.

The processing proceeds from Step S3106 to Step S1103. As in the case of the flow chart in the first embodiment as illustrated in FIG. 4, a focus driving signal is generated based on a product of the operating amount of the focus operating knob and the obtained focus operating sensitivity.

When the focus operating sensitivity is not 0 in Step S3102, the processing proceeds to Step S3106. Then, the focus lock releasing timer value is cleared to 0 and the processing proceeds to Step S1103.

After that, as in the case of the first embodiment, in Step S1104, the focus driving is performed in response to the focus driving signal.

Fourth Embodiment

In the fourth embodiment, the focus demand 18 is a demand having an operation end to which an operable range is mechanically limited, that is, a demand having mechanical operation limit. A rotating angle of the focus operating knob is mechanically limited to a predetermined range. A relationship between the operating position of the focus operating knob and the focus driving position is defined by Expression (4).

(Focus driving position)=(focus operating sensitivity)×(knob operating position)+(position offset)  (4)

When the focus operating sensitivity is fixed, the focus operating sensitivity is equal to 1 and the position offset is equal to 0. Therefore, a relationship expressed by connecting both knob operating position ends and both focus driving position ends are connected with a straight line, that is, a relationship in which the origin point and a point (Cntl2, Posi2) are connected to each other in FIG. 11 is a linear relationship, and hence the knob operating position and the focus driving position have a linear relationship.

Figure 11:
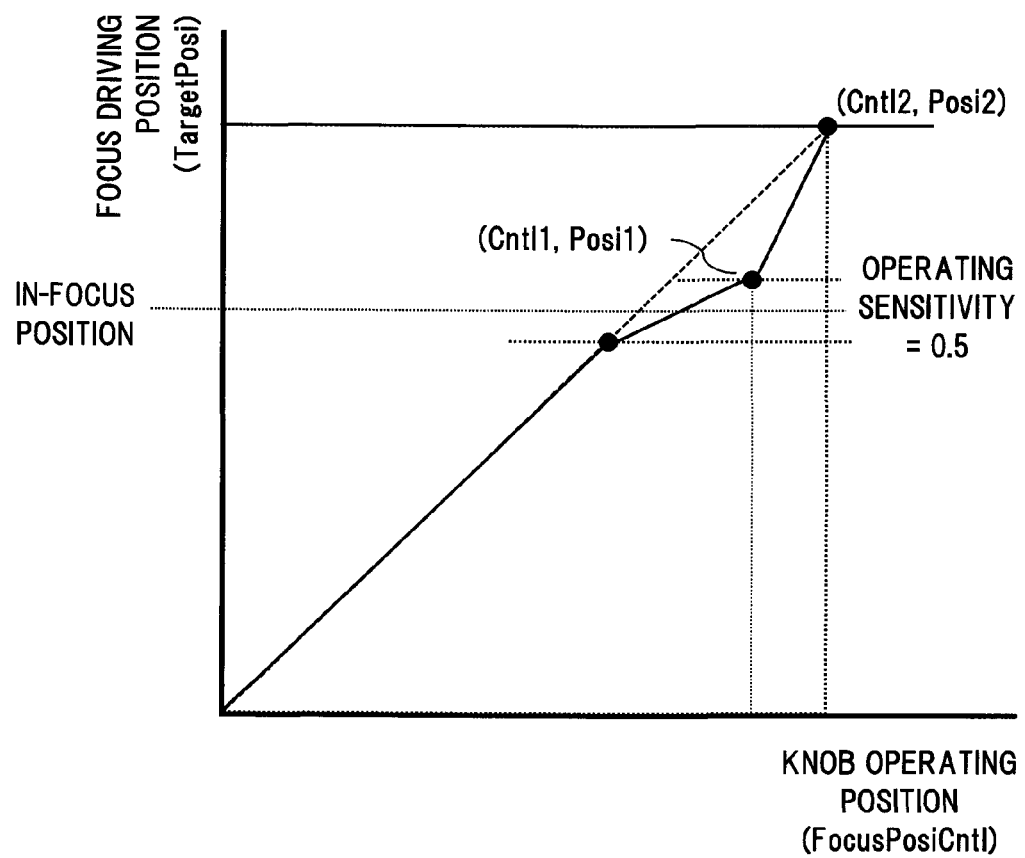
FIG. 11 illustrates a relationship between a focus operating position and a focus driving position in the third embodiment.

In the fourth embodiment, the solid line illustrated in FIG. 11 exhibits the relationship between the knob operating position and the focus driving position in the case where the focus operating sensitivity is variable. For example, when the defocus amount computed by the focal position detecting unit is equal to or smaller than a threshold value, the focus operating sensitivity is set to 0.5 which is half the value in the case where the focus operating sensitivity is fixed.

Figure 12:
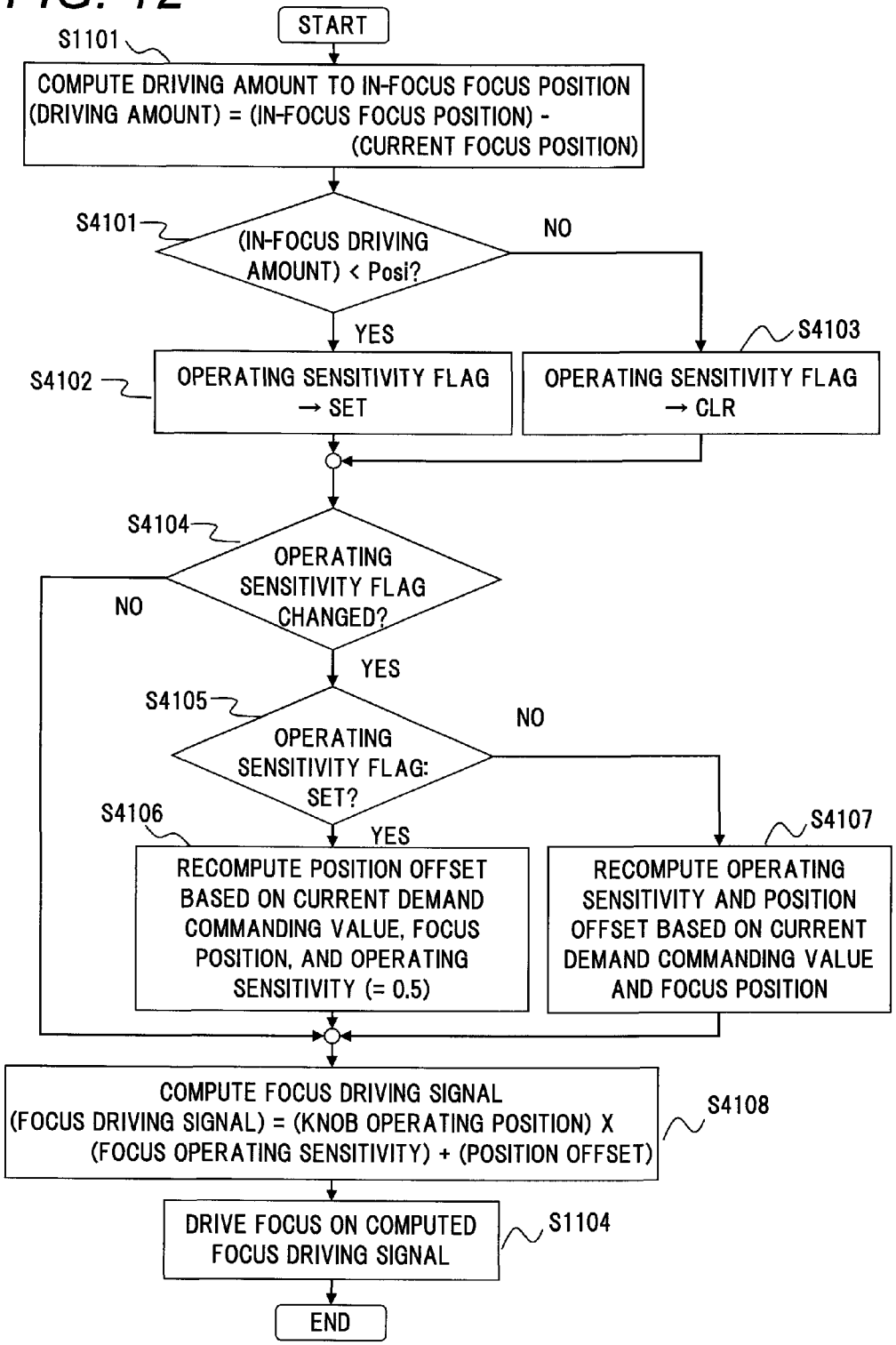
FIG. 12 is a flowchart of the procedure for the computing of focus operating sensitivity in a fourth embodiment of the present invention.

FIG. 12 is a flow chart illustrating focus operating sensitivity computing according to this embodiment. In Step S1101, the focus driving amount required for shifting to the in-focus position is computed based on the defocus amount computed by the focus detector and the current focus position detected by the focus position detecting unit. In Step S4101, whether or not the focus driving amount required for shifting to the in-focus position is smaller than a threshold value (Posi) for changing the focus operating sensitivity is determined. When the focus driving amount is smaller than the threshold value, the processing proceeds to Step S4102 to set an operating sensitivity flag. When the focus driving amount is equal to or larger than the threshold value, the processing proceeds to Step S4103 to clear the operating sensitivity flag.

Then, the processing proceeds to Step S4104 and whether or not the operating sensitivity flag is changed from a preceding state is determined. When the operating sensitivity flag is changed from the preceding state, the processing proceeds to Step S4105. When the operating sensitivity flag is not changed from the preceding state, the processing proceeds to Step S4108.

In Step S4105, the state of the operating sensitivity flag is confirmed. When the operating sensitivity flag is set, the processing proceeds to Step S4106. When the operating sensitivity flag is cleared, the processing proceeds to Step S4107. In Step S4106, the focus operating sensitivity is set to 0.5 and a current focus command signal (knob operating position) and a current focus driving position are substituted into Expression (4), to compute a position offset.

In Step S4107, the current focus command value (knob operating position), the current focus driving position, a focus command value (knob operating position) of a knob operation end, and a focus driving position of a focus driving position end are substituted into Expression (4) to compute focus operating sensitivity and a position offset. Assume that the knob operating position of the knob operation end and the focus driving position of the focus driving position end correspond to an end portion on a side toward which focus is being driven by knob operation. That is, in a case of knob operation for shifting the focus position to a close side, the end portion is a close side end. In a case of knob operation for shifting the focus position to an infinity side, the end portion is an infinity side end. For example, a case where, in FIG. 11, the knob operating position reaches a point (Cntl1, Posi1) from the left side by knob operation, the defocus amount exceeds the threshold value, and the focus operating sensitivity is changed from 0.5 is considered. In this case, a value of the end position point (Cntl2, Posi2) in a focus shift direction is used. Therefore, even in a case of the demand having mechanical operation limit in which the operation is limited in the rotating angle of the focus operating knob, fine focus adjustment may be performed in the vicinity of the in-focus position. In addition, when the focus operating knob is moved to the end position, the driving to the end position of the focus driving position may be achieved.

As described above, even when the focus demand having mechanical operation limit is used, the focus operating sensitivity may be lowered in the vicinity of the in-focus position up to the end portion to facilitate focus adjustment and perform focus driving to the focus driving end portion.

Fifth Embodiment

In the fifth embodiment, assume that the focus demand 18 performs focus operation using an endless demand. The lens controller (field depth computing unit) 9 computes an field depth based on iris status information from the iris position detecting unit 12 of FIG. 1 and the zoom position information from the zoom position detecting unit 11 of FIG. 1. The focus operating sensitivity is computed in view of the field depth.

Figure 13:
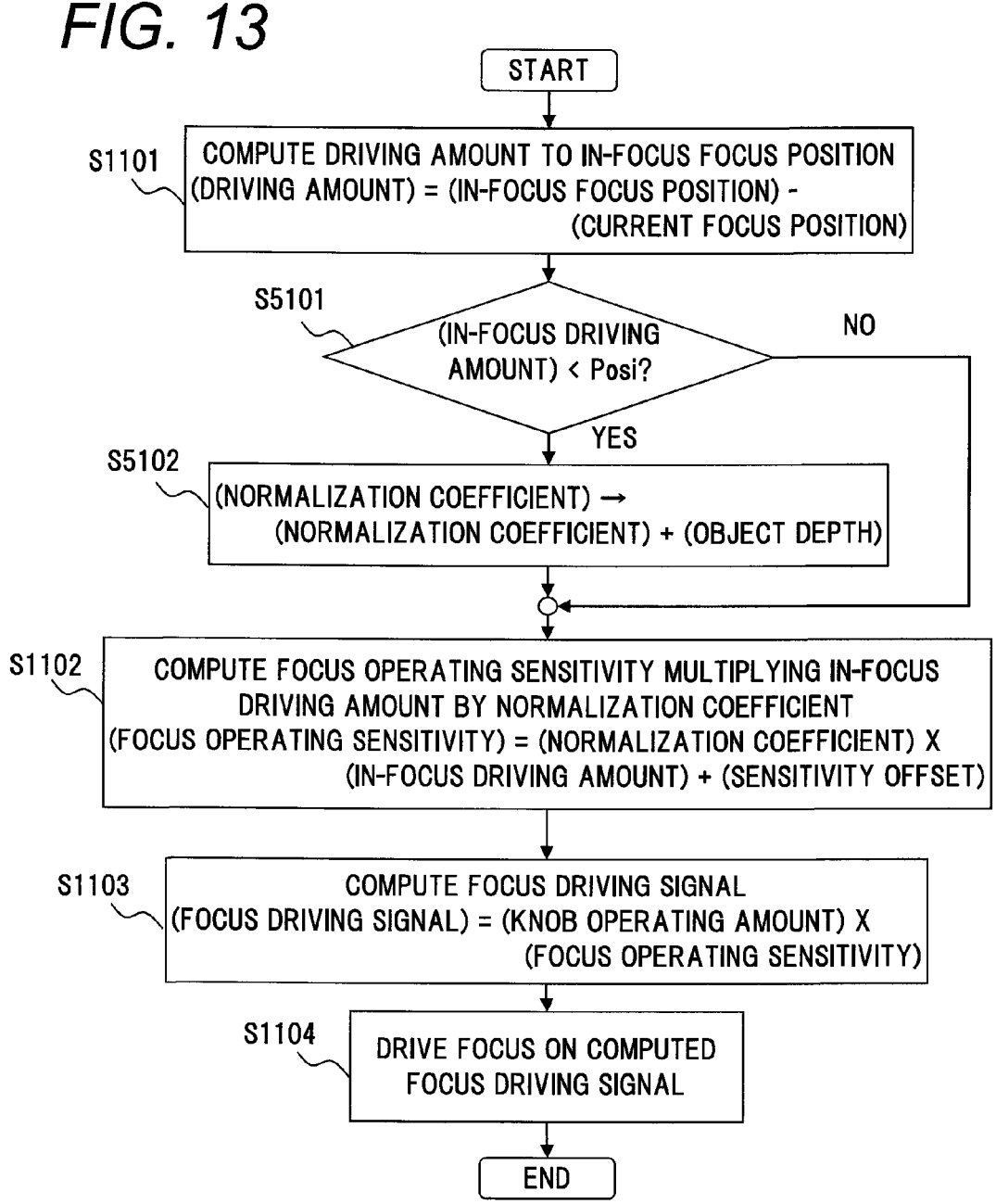
FIG. 13 is a flowchart of the procedure for the computing of focus operating sensitivity in a fifth embodiment of the present invention.

FIG. 13 is a flowchart illustrating focus operating sensitivity computing according to this embodiment. In Step S1101, the focus driving amount required for shifting to the in-focus position is computed based on the defocus amount computed by the focus detector and the current focus position detected by the focus position detecting unit. In Step S5101, whether or not the focus driving amount required for shifting to the in-focus position is smaller than the threshold value (Posi) for changing the focus operating sensitivity is determined. When the focus driving amount is smaller than the threshold value, the processing proceeds to Step S5102. When the focus driving amount is equal to or larger than the threshold value, the processing proceeds to Step S1102.

In Step S5102, the field depth value is added to the coefficient for normalizing the focus operating sensitivity to change the focus operating sensitivity according to the field depth. That is, when the field depth is small, the normalizing coefficient is smaller than in a case where the field depth is large, and hence the focus operating sensitivity is also small.

In Step S1102, the focus operating sensitivity is determined by multiplying the focus driving amount required for shifting to the in-focus position by the coefficient for normalizing the focus operating sensitivity. In this embodiment, as in the case of the first embodiment, the sensitivity offset is added to the focus operating sensitivity to prevent the focus operation from being locked in the in-focus position. Then, the processing proceeds to Step S1103. The focus driving amount is computed based on the focus operating sensitivity computed in Step S1102 and the focus operating amount. In Step S1104, the focus driving is performed.

As described above, in the vicinity of the in-focus position, when the field depth is large, the focus operating sensitivity is large. In contrast to this, when the field depth is small, the focus operating sensitivity is small. In other words, the focus operating sensitivity may be varied according to the field depth only in the vicinity of the in-focus position, and hence the operability in focus adjustment may be improved.

Sixth Embodiment

In Embodiment 6, as in the case of the fourth embodiment, the focus demand 18 is a demand having mechanical operation limit. The rotating angle of the focus operating knob of the focus demand 18 is mechanically limited to a predetermined range.

Even in the focus adjusting apparatus according to this embodiment, as in the case of the fifth embodiment, the field depth is computed based on the iris status information from the iris position detecting unit 12 and the zoom position information from the zoom position detecting unit 11. The focus operating sensitivity is computed in view of the field depth. The focus operating sensitivity is computed in view of the field depth.

Figure 14:
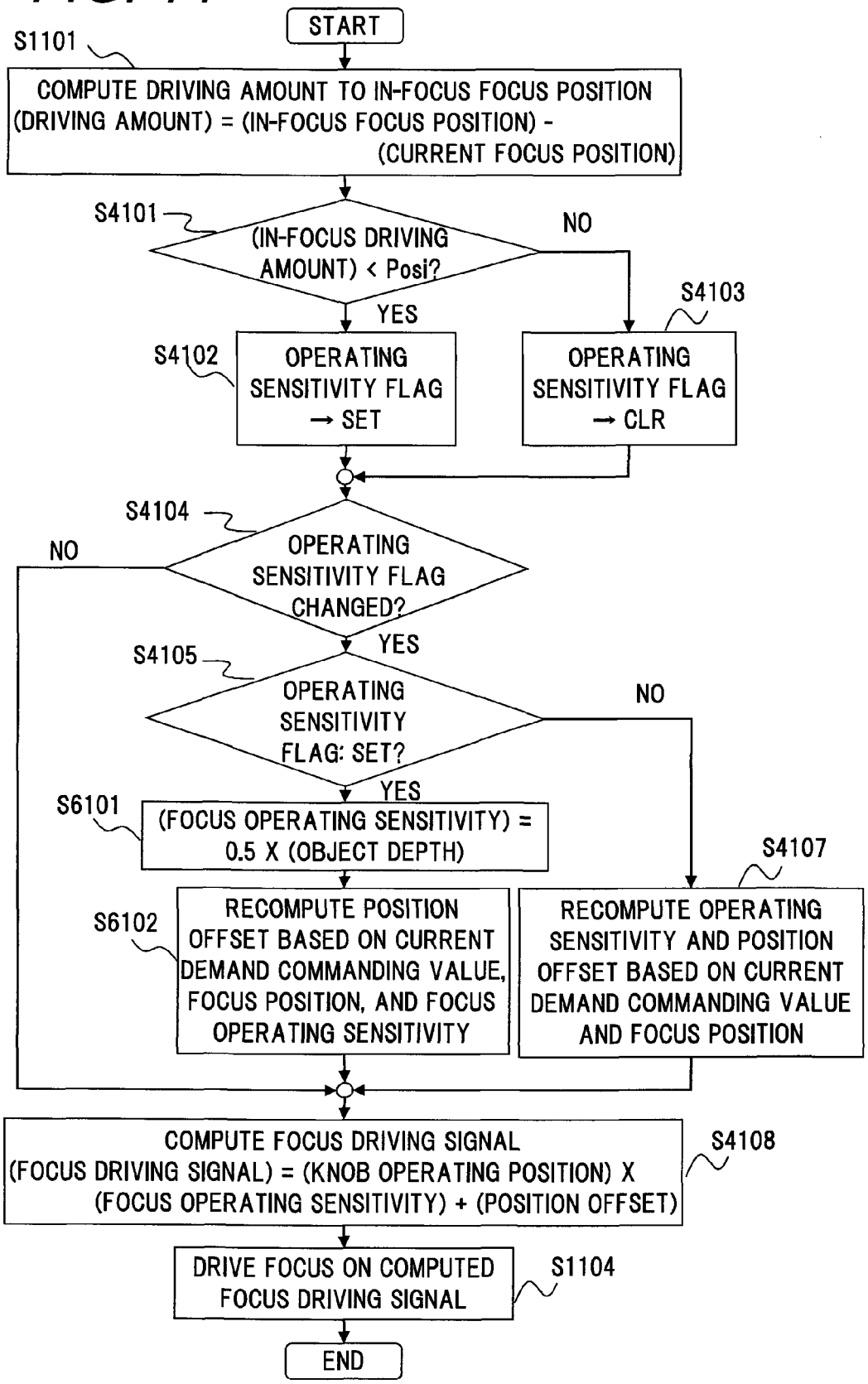
FIG. 14 is a flowchart of the procedure for the computing of focus operating sensitivity in a sixth embodiment of the present invention.
Figure 15:
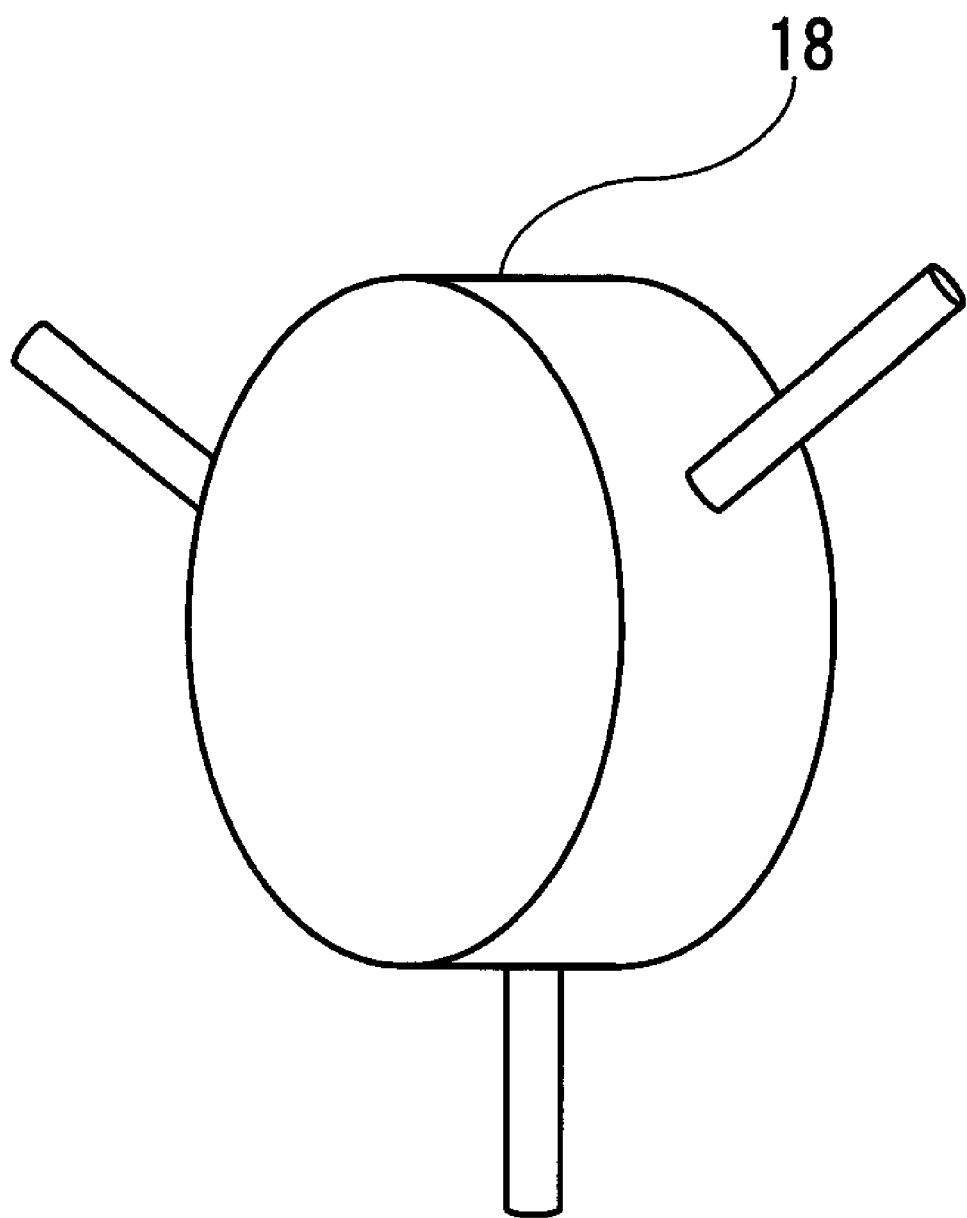
FIG. 15 illustrates a focus demand (a focus operating knob).
Figure 16:
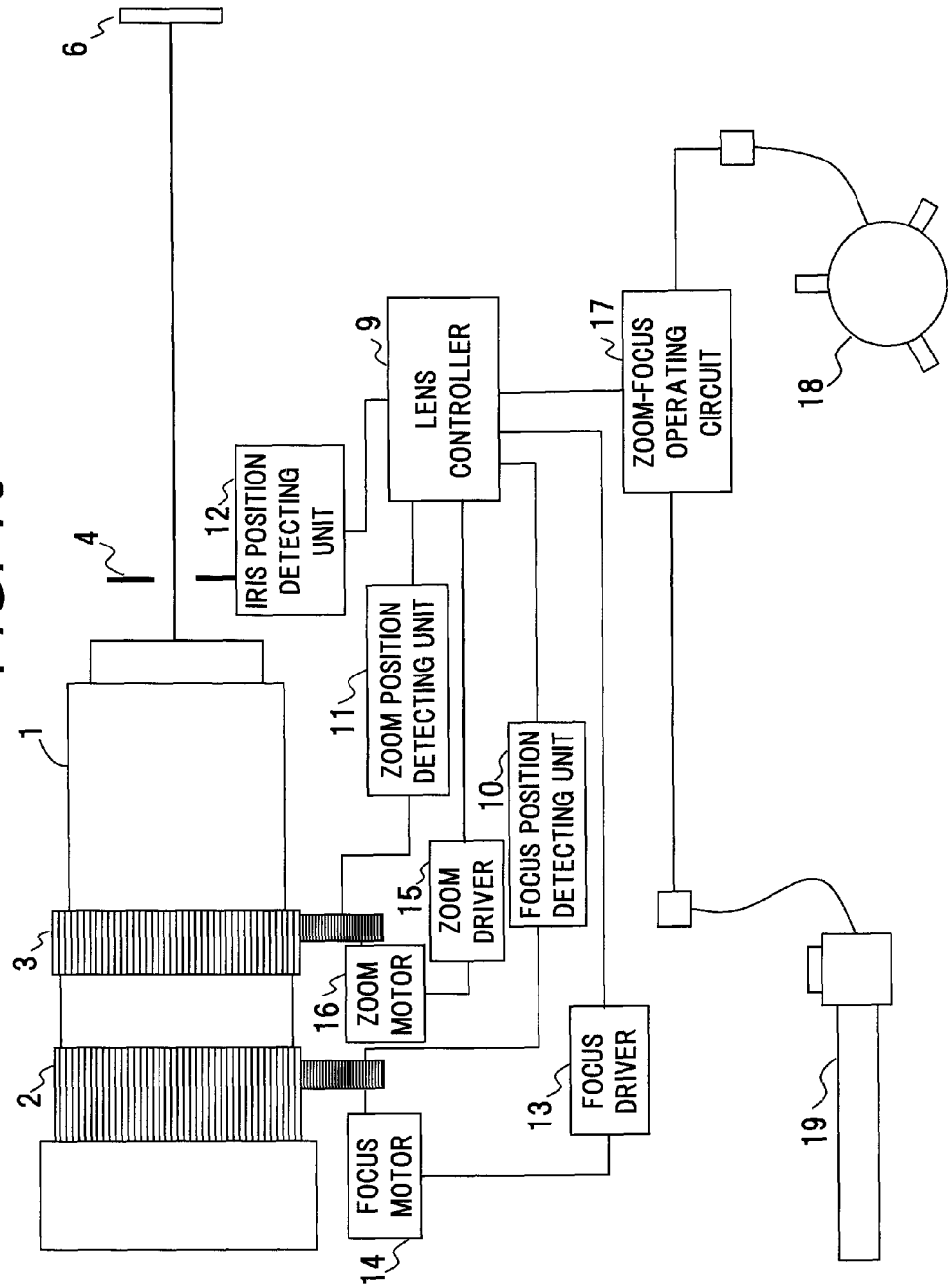
FIG. 16 is a block structural diagram illustrating a conventional focus adjusting apparatus.

FIG. 14 is a flow chart illustrating focus operating sensitivity computing according to this embodiment. In Step S1101, the focus driving amount required for shifting to the in-focus position is computed based on the defocus amount computed by the focus detector and the current focus position detected by the focus position detecting unit.

In Step S4101, whether or not the focus driving amount required for shifting to the in-focus position is smaller than the threshold value (Posi) for changing the focus operating sensitivity is determined. When the focus driving amount is smaller than the threshold value, the processing proceeds to Step S4102 to set the operating sensitivity flag. When the focus driving amount is equal to or larger than the threshold value, the processing proceeds to Step S4103 to clear the operating sensitivity flag.

Then, the processing proceeds to Step S4104 and whether or not the operating sensitivity flag is changed from a preceding state is determined. When the operating sensitivity flag is changed from the preceding state, the processing proceeds to Step S4105. When the operating sensitivity flag is not changed from the preceding state, the processing proceeds to Step S4108.

In Step S4105, the state of the operating sensitivity flag is checked. When the operating sensitivity flag is set, the processing proceeds to Step S6101. When the operating sensitivity flag is cleared, the processing proceeds to Step S4107. In Step S6101, the focus operating sensitivity is computed based on the field depth.

In Step S6102, the focus operating sensitivity computed in Step S6101, the current focus command signal (knob operating position) and the focus driving position are substituted into Expression (4) to compute the position offset.

In Step S4107, as described in Step S4107 in the fourth embodiment, the current focus command value (knob operating position), the current focus driving position, the focus command value (knob operating position) of the knob operation end, and the focus driving position of the focus driving position end are substituted into Expression (4) to compute the focus operating sensitivity and the position offset. Therefore, as in the case of the fourth embodiment, even in the case of the demand having mechanical operation limit in which the rotating angle of the focus operating knob is limited, fine focus adjustment may be performed in the vicinity of the in-focus position. In addition, when the focus operating knob is moved to the end position, the driving to the end position of the focus driving position may be achieved.

As described above, even when the focus demand having mechanical operation limit is used, the focus operating sensitivity may be lowered in the vicinity of the in-focus position and varied according to the field depth to facilitate focus adjustment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-083773, filed Mar. 31, 2010, which is hereby incorporated by reference herein in its entirety.

What is claimed is:

1. A focus adjusting apparatus comprising:
   a focus operating unit for generating a focus command signal for driving a focus lens according to an operating amount of the focus operating unit;
   a focus driving unit for driving the focus lens in response to the focus command signal from the focus operating unit;
   a focus position detecting unit for detecting a position of the focus lens;
   a focus detecting unit for detecting a focus information;
   an operation sensitivity determining unit for determining a focus operating sensitivity of the focus operating unit based on an in-focus information obtained by the focus detecting unit and the position of the focus lens where the focus operating sensitivity of the focus operating unit is defined as a ratio of a moving amount of the focus lens to an operating amount of the focus operating unit; and
   a unit for setting the focus operating sensitivity to a predetermined value other than 0 in a case where the focus operating sensitivity computed by the operation sensitivity determining unit is 0,
   wherein the focus driving unit drives the focus lens according to the focus operating sensitivity determined by the operation sensitivity determining unit.

2. A focus adjusting apparatus according to claim 1, further comprising:
   a zoom position detecting unit for detecting a position of a zoom lens,
   wherein the operation sensitivity determining unit computes the focus operating sensitivity based on the position of the zoom lens obtained by the zoom position detecting unit.

3. A focus adjusting apparatus according to claim 1, further comprising a focus mode switching unit for switching between a mode in which the focus operating sensitivity is variable and a mode in which the focus operating sensitivity is fixed.

4. A focus adjusting apparatus according to claim 1, further comprising:
   an iris position detecting unit for detecting an iris state;
   a zoom position detecting unit for detecting a position of a zoom lens; and
   a field depth computing unit for computing a field depth,
   wherein the operation sensitivity determining unit computes the focus operating sensitivity based on the field depth computed by the field depth computing unit.

5. A focus adjusting apparatus according to claim 1, wherein the focus operating unit comprises an operating knob having an operable range that is not mechanically limited.

6. A focus adjusting apparatus according to claim 1, wherein the focus operating unit comprises an operating knob having an operable range that is mechanically limited.

7. A focus adjusting apparatus according to claim 6, wherein the operation sensitivity determining unit determines the focus operating sensitivity of the focus operating unit based on the in-focus information obtained by the focus detecting unit, the position of the focus lens, and an end position in a direction in which the focus lens is shifting, so that the focus lens is able to be driven to the end position by the operation of the operating knob having the operable range mechanically limited.

8. A focus adjusting apparatus according to claim 1, wherein the focus detecting unit comprises a phase difference type line sensor.

9. A lens apparatus comprising:
   a focus lens; and
   a focus adjusting apparatus,
   wherein the focus adjusting apparatus comprises:
      a focus operating unit for generating a focus command signal for driving the focus lens according to an operating amount of the focus operating unit;
      a focus driving unit for driving the focus lens in response to the focus command signal from the focus operating unit;
      a focus position detecting unit for detecting a position of the focus lens;
      a focus detecting unit for detecting a focus information;
      an operation sensitivity determining unit for determining a focus operating sensitivity of the focus operating unit based on an in-focus information obtained by the focus detecting unit and the position of the focus lens where the focus operating sensitivity of the focus operating unit is defined as a ratio of a moving amount of the focus lens to an operating amount of the focus operating unit; and
      a unit for setting the focus operating sensitivity to a predetermined value other than 0 in a case where the focus operating sensitivity computed by the operation sensitivity determining unit is 0,
      wherein the focus driving unit drives the focus lens according to the focus operating sensitivity determined by the operation sensitivity determining unit.

10. A camera system comprising:
    a lens apparatus including a focus lens; and
    a camera apparatus for performing image pickup of an object image through the lens apparatus; and
    wherein the camera apparatus includes a focus adjusting apparatus, and wherein the focus adjusting apparatus comprises:
- a focus operating unit for generating a focus command signal for driving the focus lens according to an operating amount of the focus operating unit;
- a focus driving unit for driving the focus lens in response to the focus command signal from the focus operating unit;
- a focus position detecting unit for detecting a position of the focus lens;
- a focus detecting unit for detecting a focus information;
- an operation sensitivity determining unit for determining a focus operating sensitivity of the focus operating unit based on an in-focus information obtained by the focus detecting unit and the position of the focus lens where the focus operating sensitivity of the focus operating unit is defined as a ratio of a moving amount of the focus lens to an operating amount of the focus operating unit; and
- a unit for setting the focus operating sensitivity to a predetermined value other than 0 in a case where the focus operating sensitivity computed by the operation sensitivity determining unit is 0, wherein the focus driving unit drives the focus lens according to the focus operating sensitivity determined by the operation sensitivity determining unit.

* * * * *